(12) United States Patent
Freeman et al.

(10) Patent No.: US 10,832,097 B2
(45) Date of Patent: Nov. 10, 2020

(54) DEVICE AND A METHOD FOR IMAGE CLASSIFICATION USING A CONVOLUTIONAL NEURAL NETWORK

(71) Applicant: Aptiv Technologies Limited, St. Michael (BB)

(72) Inventors: Ido Freeman, Düsseldorf (DE); Lutz Roese-Koerner, Remscheid (DE); Christof Petig, Wuppertal (DE); Peet Cremer, Düsseldorf (DE)

(73) Assignee: Aptiv Technologies Limited, St. Michael (BB)

( * ) Notice: Subject to any disclaimer, the term of this patent is extended or adjusted under 35 U.S.C. 154(b) by 94 days.

(21) Appl. No.: 16/241,091

(22) Filed: Jan. 7, 2019

(65) Prior Publication Data
US 2019/0220709 A1 Jul. 18, 2019

(30) Foreign Application Priority Data

Jan. 18, 2018 (EP) .................................. 18152378
Dec. 18, 2018 (EP) .................................. 18213652

(51) Int. Cl.
*G06K 9/00* (2006.01)
*G06E 1/00* (2006.01)
(Continued)

(52) U.S. Cl.
CPC ......... *G06K 9/6277* (2013.01); *G06K 9/6217* (2013.01); *G06N 3/04* (2013.01); *G06N 3/0454* (2013.01); *G06N 3/08* (2013.01)

(58) Field of Classification Search
USPC ....... 382/100, 103, 155, 157, 159, 168, 181, 382/219, 224, 232, 254, 276, 305; 1/1;
(Continued)

(56) References Cited

U.S. PATENT DOCUMENTS 10,268,950 B2 * 4/2019 Yin ........................ G06K 9/628
2018/0173571 A1 * 6/2018 Huang ................ G06F 13/1678
(Continued)

FOREIGN PATENT DOCUMENTS

CN 107392214 A 11/2017

*Primary Examiner* — Seyed H Azarian
(74) *Attorney, Agent, or Firm* — Colby Nipper PLLC

(57) ABSTRACT

A device for image classification comprising a convolutional neural network configured to generate a plurality of probability values, each probability value being linked to a respective one of a plurality of predetermined classes and indicating the probability that the image or a pixel of the image is associated with the respective class, and the convolutional neural network comprises a plurality of convolutional blocks and each of the convolutional blocks comprises: a first convolutional layer configured to perform a pointwise convolution using a first kernel, a second convolutional layer configured to perform a depthwise convolution using a second kernel, wherein the second kernel has one of a single row and a single column, a third convolutional layer configured to perform a depthwise convolution using a third kernel, wherein the third kernel has a single column if the second kernel has a single row, and the third kernel has a single row if the second kernel has a single column, and a fourth convolutional layer configured to perform a convolution using a fourth kernel.

16 Claims, 3 Drawing Sheets

(51) Int. Cl.
   *G06K 9/62* (2006.01)
   *G06N 3/08* (2006.01)
   *G06N 3/04* (2006.01)

(58) Field of Classification Search
   USPC .............................................. 706/6, 20, 15
   See application file for complete search history.

(56) References Cited

U.S. PATENT DOCUMENTS

2018/0189215 A1* 7/2018 Boesch .................... G06F 30/34
2018/0189229 A1* 7/2018 Desoli ................ G06F 13/4022
2019/0180443 A1* 6/2019 Xue ......................... G06K 9/66
2020/0090305 A1* 3/2020 El-Khamy ........... G06N 3/0454

\* cited by examiner

DEVICE AND A METHOD FOR IMAGE CLASSIFICATION USING A CONVOLUTIONAL NEURAL NETWORK

TECHNICAL FIELD OF INVENTION

The invention concerns a device and a method for image classification using a convolutional neural network.

BACKGROUND OF INVENTION

The entire field of computer vision and image understanding has been in recent years completely taken over by convolutional neural networks (CNNs). CNNs are a powerful class of algorithms which applies multiple layers of convolution-based blocks to an input. Unlike other convolution-based algorithms, the convolutional kernels are learned from data such that they generate responses to elements of increasing complexity. For example, a network with 3 layers, trained to differentiate cats from humans in an image will commonly learn to detect low-level features like edges and color gradients in the first layer. The second layer will combine these edges and gradients to look for pointy ears and a torso. The last layer will further combine the data and learn that a tall object with two legs and no fur is a human while an object with pointy ears, paws and a tail is a cat.

CNNs have been dominating university research in the field for about a decade while industrial application has only recently started to emerge. This delayed transition from pure research to application oriented development has two main reasons. The first reason is the maturity of the field which plays a significant role in every academia-industry transition of methods. Second and perhaps more important are the computational costs required for training and predicting with neural networks. Modern state-of-the-art artificial neural networks require billions of computations (floating point operations, FLOPS) and are thus normally executed on a series of high-end graphical processing units (GPUs) while exhibiting sub-interactive prediction cycles. While universities mostly aim for accuracy regardless of cost and efficiency, clients are not willing to settle for anything less than low-power, extremely cheap yet real-time algorithms and so a discrepancy emerges.

Many companies overcome this challenge by outsourcing computational effort to the cloud thus requiring a constant internet connection and a tolerance to latencies. Others choose to comply with the current technological limitations and opt for an expensive hardware. Latest work in the field reviewed the nature of the building blocks used, the convolution operation, and tried to improve their efficiency.

Recent work has been published in the following documents D1 to D4:

D1 Howard, Andrew G., et al., "MobileNets: Efficient Convolutional Neural Networks for Mobile Vision Applications", arXiv preprint arXiv: 1704.04861, 2017;

D2 Zhang, Xiangyu, et al., "ShuffleNet: An Extremely Efficient Convolutional Neural Network for Mobile Devices", arXiv preprint arXiv: 1707.01083, 2017;

D3 Chollet, François, "Xception: Deep Learning with Depthwise Separable Convolutions", arXiv preprint arXiv: 1610.02357, 2016; and D4 Kaiming, He, et al., "Deep Residual Learning for Image Recognition", Proceedings of the IEEE conference on computer vision and pattern recognition, 2016, pages 770-778.

Despite the significant improvements both in terms of runtime and memory consumption demonstrated by existing technics, they present suboptimal accuracies when applied to slim models. Our experiments show that these technics rely heavily on taking extremely large networks, which have significantly more parameters than the minimum needed for the task, and making them slimmer and more efficient. Yet, applying these technics to small networks persistently results in a significant loss in prediction accuracy.

SUMMARY OF THE INVENTION

Described herein is a device for image classification comprising a convolutional neural network, wherein the device generates results with a high accuracy and with less computational effort compared to conventional devices. It is further an object of the invention to provide a system that comprises the device and a method for classifying images comprising a convolutional neural network.

In a first aspect of the instant application a device for image classification comprising a convolutional neural network is provided.

The device is configured to receive an image that was captured by a camera. The image comprises a plurality of pixels. The convolutional neural network is configured to generate a plurality of probability values, in particular pseudo probability values, wherein each probability value is linked to a respective one of a plurality of predetermined classes and indicates the probability that the image or a pixel of the image is associated with the respective class. The classes divide the objects shown in the image in different categories that are predefined by the developer. For example, if road scenes are considered, there can be a class for vehicles, another class for pedestrians, another class for roads and another class for buildings. Since there are four predetermined classes in this example, for each image four probability values, in particular pseudo probability values, are generated. The probability value for one of the classes then indicates the probability that the image shows an object from this particular class. For example, the probability value for the class "vehicle" indicates the probability that the image shows a vehicle or a portion of a vehicle.

Further, it may be provided that the plurality of probability values is generated for each pixel of the input image. The probability value of a given pixel for one of the classes then indicates the probability that the respective pixel is associated with this particular class. In the example given above, the probability value of a given pixel for the class "vehicle" then indicates the probability that the pixel shows a portion of a vehicle.

Image classification by means of convolutional neural networks is known to a skilled person in general. Convolutional neural networks are a sort of artificial neural networks designed to mimic the human visual processing system from the eye to the visual cortex. They are made of an arbitrary number of consecutive layers which are trained together to fulfil the visual task of object classification. Each layer of the convolutional neural network learns to recognize features which are relevant to the specific task in an increasing complexity. The final layer of the convolutional neural network outputs an array of pixels where an individual probability value for each class is assigned to each pixel.

The convolutional neural network of the device according to the first aspect of the application comprises a plurality of convolutional blocks, for example, two or three or four convolutional blocks. The convolutional blocks may be arranged consecutively, which means that the image captured by the camera is input into a first convolutional block, an output of the first convolutional block is fed as an input to a second convolutional block, an output of the second convolutional block is fed as an input to a third convolutional block, etc. Each of the convolutional blocks comprises a first convolutional layer, a second convolutional layer, a third convolutional layer and a fourth convolutional layer. It shall be noted that conventional convolutional blocks contain a single convolutional layer. Each of the convolutional blocks disclosed in this application approximates the functionality of a single conventional convolutional layer, saving computational effort and, in particular, storage space.

Each of the four convolutional layers according to the first aspect of the application comprises a respective kernel (also called convolutional kernel or filter) which is swiped (or slides) over an input signal, wherein a convolution is performed between the kernel and the input signal. The kernel is an array or a matrix of numbers which are also called weights or parameters. The kernel has a number of rows, a number of columns, a number of input channels and a number of output channels. The kernel is thus a four-dimensional tensor given in the following format: [rows, columns, channels in, channels out]. In case only the rows and columns of a kernel are considered, the size of a kernel can be given in the format a×b, wherein a is the number of rows and b is the number of columns. For example, a kernel with the size of 2×1 has two rows and one column. A kernel with the size of 1×1, i.e., a single row and a single column, performs a pointwise convolution.

A convolution that does not combine the input channels but performs a convolution on each input channel separately is called a depthwise convolution. For a depthwise convolution the number of input channels is equal to the number of output channels.

In the convolutional neural network according to the first aspect, the first convolutional layer receives an input and is configured to perform a pointwise convolution using a first kernel, i.e., the first kernel has the size of 1×1. The convolution performed by the first convolutional layer is a conventional (or regular) convolution, but not a depthwise convolution.

The output of the first convolutional layer is fed as an input to the second convolutional layer. The second convolutional layer is configured to perform a depthwise convolution using a second kernel. The second kernel has either a single row or a single column. It can also be provided that two second convolutional layers are arranged in parallel, which both perform a depthwise convolution having the same kernel size, and both layers together have twice as many output channels than input channels.

The output of the second convolutional layer is fed as an input to the third convolutional layer. The third convolutional layer is configured to perform a depthwise convolution using a third kernel. The third kernel has a single column if the second kernel has a single row. If the second kernel, however, has a single column, the third kernel has a single row. In particular, the numbers of rows and columns of the third kernel are interchanged compared to the numbers of rows and columns of the second kernel.

The output of the third convolutional layer is fed as an input to the fourth convolutional layer. The fourth convolutional layer is configured to perform a convolution using a fourth kernel. The convolution performed by the fourth convolutional layer is a conventional (or regular) convolution, but not a depthwise convolution.

According to the first aspect of the invention, the problem of decreased accuracies in recent models described in documents D1 to D4 is solved by a revisited structure of the convolution blocks. The proposed convolutional blocks are still significantly cheaper to compute than the common structure while sacrificing little to no accuracy.

In one embodiment, the number of columns of the second kernel is 3 and the number of rows of the third kernel is 3 if the second kernel has a single row. In this case, the second kernel has a size of 1×3, and the third kernel has a size of 3×1.

Alternatively, the number of rows of the second kernel is 3 and the number of columns of the third kernel is 3 if the second kernel has a single column. In this case, the second kernel has a size of 3×1, and the third kernel has a size of 1×3.

In a further embodiment, the second convolutional layer is configured to perform a pooling operation after the depthwise convolution. The pooling operation combines a number of outputs of the depthwise convolution into a single output. In particular, the pooling operation is a one-dimensional pooling operation, i.e., the pooling is performed along a row or a column, but not along a row and a column. In this case, pooling is performed, for example, from a 1×2 patch or a 2×1 patch. The pooling operation may be a max-pooling, where a patch of a predetermined size is taken from an input and a single number that is the maximal element of the patch is returned as the output.

Moreover, the fourth convolutional layer may be configured to apply the fourth kernel in strides to pixels of an input of the fourth convolutional layer, for example, in strides of two. Stride controls how the fourth kernel convolves around the input of the fourth convolutional layer. If the stride is set to two, the fourth kernel convolves around the input by shifting two units at a time. The amount by which the fourth kernel shifts is the stride.

The stride of the fourth kernel may be one-dimensional. The fourth kernel then convolves around the input by shifting a number of units along a row or a column at a time, but not along a row and a column at the same time.

Further, it may be provided that the number of output channels of the fourth convolutional layer is twice the number of the output channels of the first convolutional layer.

In one embodiment, the second kernel has a single row and the second convolutional layer is configured to perform a pooling operation, in particular a one-dimensional pooling operation, after the depthwise convolution. In this case, the fourth kernel has two rows and one column, i.e., the fourth kernel has a size of 2×1. In particular, the fourth convolutional layer is configured to apply the fourth kernel in strides along an axis perpendicular to the pooling axis.

In a further embodiment, the second kernel has a single column and the second convolutional layer is configured to perform a pooling operation, in particular a one-dimensional pooling operation, after the depthwise convolution. In this case, the fourth kernel has one row and two columns, i.e., the fourth kernel has a size of 1×2. In particular, the fourth convolutional layer is configured to apply the fourth kernel in strides along an axis perpendicular to the pooling axis.

In yet a further embodiment, the second convolutional layer is configured not to perform a pooling operation after the depthwise convolution and the convolution performed by the fourth convolutional layer is a pointwise convolution, i.e., the fourth kernel has a size of 1×1.

In yet a further embodiment, the first convolutional layer, the second convolutional layer, the third convolutional layer, and/or the fourth convolutional layer are configured to perform a rectification after the convolution. In particular, at least one or each layer in the block can be followed by a so called rectified linear unit (ReLU). The ReLU is usually defined elementwise as a non-linear activation function, e.g. ReLU(x)=max(0,x), i.e. negative inputs are set to zero while positive inputs remain unchanged. This allows running the calculations involved with the processing of the data in the more precise 32-bit domain while saving and reading the data in the compressed 8-bit format. In this way, the memory access rates can be increased by a factor of four if the output of each of the four convolution layers is rectified before further processing.

The second convolutional layer can be configured to perform the depthwise convolution using at least two different second kernels, each of the at least two different second kernels having one of a single row and a single column. This is to say that in addition to the second kernel of the second convolutional layer at least one further second kernel is used in this layer, wherein the second kernels differ from each other with respect to their weights. However, the second kernels have the same structure, namely that they have either a single row or a single column, but not both. The different kernels are preferably applied in parallel per input channel, i.e. each input channel is processed with each of the different kernels separately. The number of different second kernels can be defined as a hyper-parameter for the second convolutional layer and in the same fashion also for other depthwise layers. Such a hyper-parameter (dm) can generally be used to increase the capacity of a depthwise convolutional layer by a factor of dm. It does so by using dm different kernels per input channel. The usual depthwise convolution with a single kernel can be seen as a special case where dm=1. A value of 2 is preferred if multiple different kernels are to be applied. As depthwise convolutions make for the least computationally intensive operator in the network, using multiple different kernels in a depthwise convolutional layer increases the accuracy of the prediction at a low additional computational cost.

Likewise to using multiple different kernels in the second convolutional layer multiple different kernels can be used in the third convolutional layer. This is to say that the third convolutional layer can be configured to perform the depthwise convolution using at least two different third kernels, each of the at least two different third kernels having one of a single row and a single column. In particular, both, the second and third convolutional layer can employ multiple different kernels so as to strongly increase the accuracy at a low additional cost of processing.

In a further embodiment, the number of output channels of the first convolutional layer is equal to the number of input channels of the first convolutional layer multiplied with a factor, the factor preferably being in the range of 1 to 6. A factor of 6, for example, means that the layer will output 6 times more channels than input channels. The factor can be employed as a free hyper-parameter. Preferably the factor is set to one of five values, namely [0.5, 1, 2, 4, 6]. The factor is a way to modify the amount of information outputted by the first layer of a block before it is preferably downsampled (using, e.g., pooling). A value of 0.5, i.e. a decrease of information by dropping half of the channels, would lead to a bottleneck structure while a value greater 1 would lead to a reversed bottleneck structure, i.e. by increasing the number of channels by the factor. A factor greater than 1 is preferred in order to reliably increase the accuracy. The structure of the first convolutional layer is for example 1×1×ch×2.

The second convolutional layer and/or the third convolutional layer can be configured to add a bias term after the depthwise convolution. A bias term is a variable, which is used as an offset for the output of a convolutional layer. It is preferably subject to training of the neural network. As such, the bias term is comparable to a weight of a kernel. It is, however, used after the convolution by adding the bias term to the result of the convolution. It has been found that the operations of adding of the bias terms do not require significant processing resources. Preferably, a direct addition of the bias term is employed. This allows for complete parallelization of the addition operations. Initialization time is thus reduced.

Having regard to the second convolutional layer it has been found that in some applications a size of the second kernel of 3×1 has special advantages in view to computational efficiency. This holds even more if the size of the third kernel is reversed, i.e. 1×3. The swap allows to overcome the padding limitation introduced by a 1×3 convolution. While the 3×1 convolution can be efficiently calculated over an arbitrary amount of elements, the 1×3 convolution usually requires the rows' length to be divisible by 4 in order to make full use of the processing units. This means that input data with a width not divisible by 4 would require initial padding, which is an expensive operation by itself. The following convolution would then also run on these redundant elements thus wasting computational resources. As a consequence, the padded elements generated by a 1×3 convolution would either be passed on to the next layer or be removed. Both options result in additional computations. However, they are saved when the size of the second kernel is 3×1 and the size of the third kernel is 1×3.

Furthermore, many hardware architectures use cache-lines for reading data. A cache-line of 4 essentially means that four elements are read at the same time. This property can be used to parallelize the 3×1 convolution with four kernel displacements at the same time. A further aspect is that because the 3×1 convolution is significantly quicker to compute, moving it to the "top of the depthwise convolution pipeline" means that more expense consecutive operations can run, e.g., on pooled activations (the 3×1 convolution can be followed by a 2×1 max-pooling layer, which in this configuration requires only half of the processing time compared to a 1×2 max-pooling later). Therefore, the more expensive layer then runs only half of the input columns and is thus quicker by a factor of two. In this way, the overall processing time can be reduced by 15 to 20%.

Having regard to the fourth convolutional layer the size of the fourth kernel is preferably 1×2. This allows to fully utilize the cache-lines offered by usual hardware, wherein the convolutions can be performed per cache-line. In this way, a perfect parallelization of four kernel displacements can be achieved for the price of one. Combined with the additional use of strides eight displacements, i.e. convolutions can be obtained for the price of one.

The expensive phase of memory access associated with the depthwise convolutional layers can be further optimized. Since the input size is usually predetermined one or more processing parameters can be set to fixed values before the compilation. In this way, both parallelization and memory access are can be optimized.

According to a second aspect of the application, a system for image classification comprises a camera capturing an image and a device as described above.

According to a third aspect of the application, a method for classifying an image by means of a convolutional neural network comprises the following steps: receiving an image captured by a camera, the image comprising a plurality of pixels, and using the convolutional neural network to generate a plurality of probability values, each probability value being linked to a respective one of a plurality of predetermined classes and indicating the probability that the image or a pixel of the image is associated with the respective class, wherein the convolutional neural network comprises a plurality of convolutional blocks and each of the convolutional blocks comprises: a first convolutional layer performing a pointwise convolution using a first kernel, a second convolutional layer performing a depthwise convolution using a second kernel, wherein the second kernel has one of a single row and a single column, a third convolutional layer performing a depthwise convolution using a third kernel, wherein the third kernel has a single column if the second kernel has a single row and the third kernel has a single row if the second kernel has a single column, and a fourth convolutional layer performing a convolution using a fourth kernel.

The method according to the third aspect of the application may comprise the embodiments disclosed above in connection with the device according to the first aspect of the application.

Further features and advantages will appear more clearly on a reading of the following detailed description of the preferred embodiment, which is given by way of non-limiting example only and with reference to the accompanying drawings.

BRIEF DESCRIPTION OF DRAWINGS

The invention will be described in more detail in the following in an exemplary manner with reference to an embodiment and to the drawings. There are shown in these.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not necessarily the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1:
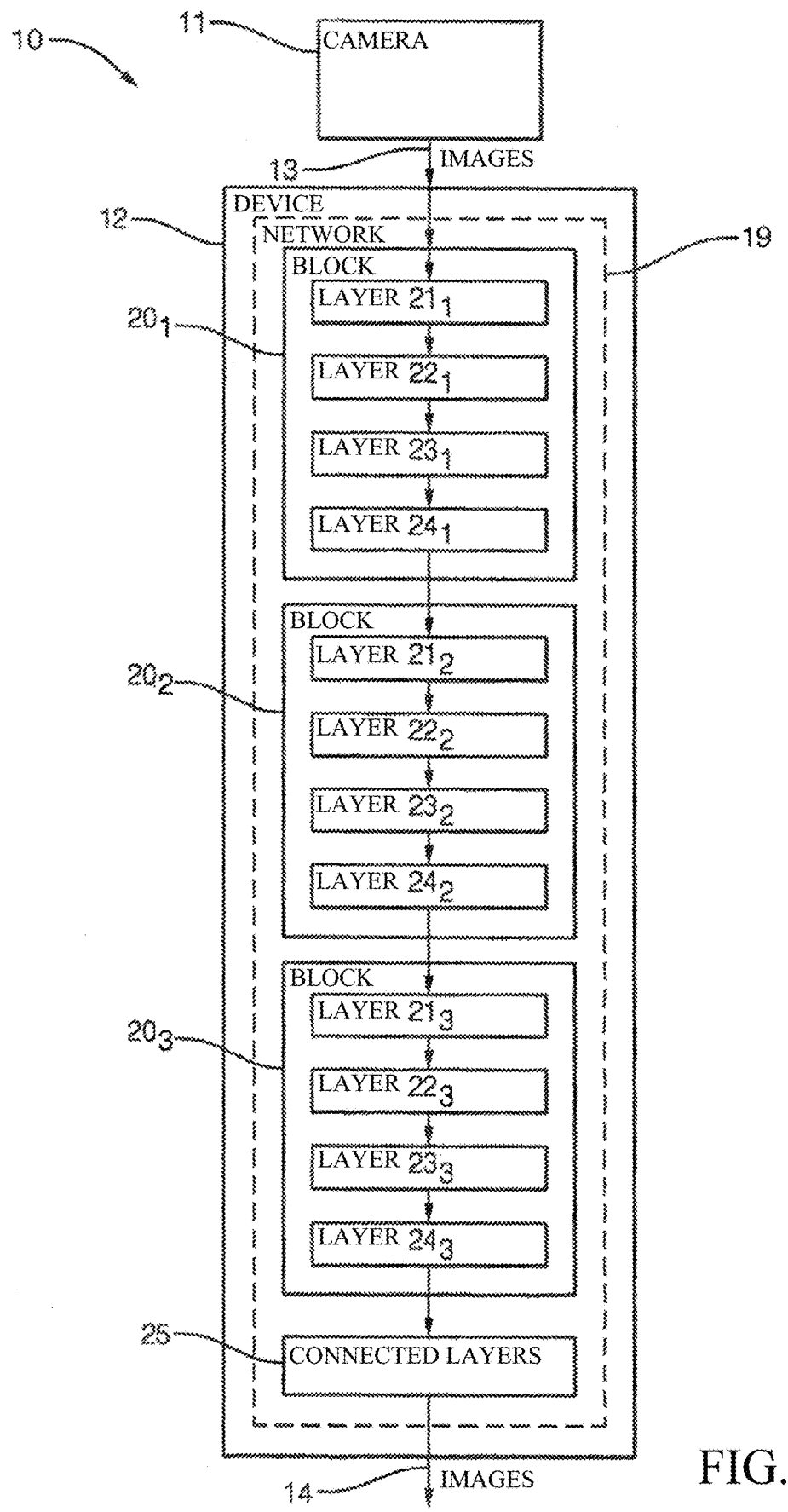
FIG. 1 shows a schematic representation of an exemplary embodiment of a system for image classification.

FIG. 1 schematically illustrates a system 10 for image classification. The system 10 includes a camera 11 and a device 12.

The camera 11 is mounted on a vehicle and captures images 13 of the area in front of the vehicle. Alternatively, the camera 11 may be directed to an area in the rear and/or at a side of the vehicle.

The images 13 captured by the camera 11 are fed to the device 12. The device 12 performs a method for classifying the images 13 and generates output images 14 which contain probability values for each of the images 13 and, in particular, for each pixel of the images 13. Each probability value indicates the probability that the respective image 13 or pixel is associated with one of a plurality of predetermined classes.

For classifying the images 13 the device 12 includes a convolutional neural network 19 that consists of several convolutional layers and performs multiple convolution and pooling operations as explained below. The different convolutional layers are trained to detect different patterns in the images 13. The final layer of the convolutional neural network 19 outputs individual probability values that are assigned to each image 13 and, in particular, to each pixel. Each probability value indicates the probability that the respective image 13 (or pixel) is associated with one of a plurality of predetermined classes (or object categories). The classes divide the objects shown in the images 13 in different categories that can be typically found in road scenes. For example, there can be a class for vehicles, another class for pedestrians, another class for roads, another class for buildings etc. The probability value of a given image 13 (or pixel) for one of the classes then indicates the probability that the respective image 13 (or pixel) shows an object from this particular class.

In one example, there are the following classes: vehicle, pedestrian, road and building. The probability values output by the final layer of the convolutional neural network 19 for one of the images 13 are, for example, 0.1, 0.1, 0.6 and 0.2 indicating the probability that this particular image 13 shows a vehicle, a pedestrian, a road and a building, respectively.

The device 11, the system 10 and the method performed by the device 11 are exemplary embodiments according to the first, second and third aspect of the application, respectively.

When examining the applicability of documents D1 and D2, reduced accuracies were exhibited. Further examination of the relevant architectures revealed that this shortcoming results from bottlenecks in data flow through the convolutional neural network itself. Both algorithms disclosed in documents D1 and D2 force large compression factors inside the convolutional blocks. This kind of compression makes the network lose information too quickly thus harming performance when there is little to no redundancy in the information, i.e., in a small network. Furthermore, both documents D1 and D2 choose to not address the first layer of the network, leaving it rather computationally expensive.

The unified general convolution block structure as explained in the following can safely replace the more expensive convolution layers disclosed in documents D1 and D2 without the risk of losing accuracy.

The convolutional neural network 19 of the device 11 illustrated in FIG. 1 includes a plurality of convolutional blocks $20_i$. In the exemplary embodiment illustrated in FIG. 1, the convolutional neural network 19 includes there convolutional blocks denoted by the reference numerals $20_1$, $20_2$ and $20_3$. The convolutional blocks $20_1$, $20_2$ and $20_3$ are arranged consecutively.

The convolutional blocks $20_1$, $20_2$ and $20_3$ have the same structure and each of them includes four consecutively arranged convolutional layers: a first convolutional layer $21_i$, a second convolutional layer $22_i$, a third convolutional layer $23_i$ and a fourth convolutional layer $24_i$ (with i=1, 2, 3).

The image 13 captured by the camera 11 includes a plurality of pixels arranged in an array. The image 13 may, for example, be an RGB image with channels for red, green and blue, a greyscale image, a grey and red image or any other suitable image.

The image 13 is fed to the first convolutional layer $21_1$ of the convolutional block $20_1$, which is the input layer of the convolutional neural network 19. All other convolutional layers of the convolutional blocks $20_1$, $20_2$ and $20_3$ are hidden layers.

Each of the convolutional layers applies a convolutional operation to its input, thereby an input volume having three dimensions (width, height and depth) is transformed to a 3D output volume of neuron activations. The output is passed to the next convolutional layer. The fourth convolutional layer $24_i$ of the convolutional block $20_i$ passes its output to the first convolutional layer $21_{i+1}$ of the next convolutional block $20_{i+1}$ (for i=1, 2). The fourth convolutional layer $24_3$ of the last convolutional block, which is the convolutional block $20_3$ in the current example, passes its result to fully connected layers 25 arranged after the last convolutional block.

Each of the four convolutional layers $21_i$, $22_i$, $23_i$ and $24_i$ includes a respective kernel which slides over the input signal of the respective convolutional layer, wherein a convolution is performed between the kernel and the input signal.

Modern convolutional neural networks apply a pooling operator for subsampling. The pooling operator, in its common configuration, takes a patch of a predetermined size from the image, for example a 2×2 patch, and returns a single number which is the maximal element of the patch. This kind of operator is biologically motivated and holds many benefits. However, it also significantly reduces the amount of information within the network and forces a data compression. As each displacement of the pooling kernel commonly takes four numbers and outputs just a single number, each pooling layer compresses the data by a factor of four, thus creating a bottleneck. The common method for coping with the pooling-induced bottlenecks is to double the number of channels (kernels) right before the pooling. By doing so the network only loses about a half of its data which is shown to be a healthy compression.

In the unified general convolution block structure proposed herein the number of channels are only compressed to half of their incoming amount in the first part of the convolutional block. For example, if one of the convolutional blocks takes 16 input channels the first part of the convolutional block compresses them to 8 channels.

Further, to lessen the aggressiveness of the pooling operator while keeping a highly efficient architecture, a dimension wise separation of the pooling operator is proposed. Instead of pooling from a 2×2 patch, we pool from a 1×2 patch (or a 2×1 patch) and afterwards pool from a 2×1 patch (or a 1×2 patch).

In addition, instead of convolving all input channels together with a 3×3 kernel, each channel is only convolved with itself, first with a 3×1 kernel (or a 1×3 kernel) and then with a 1×3 kernel (or a 3×1 kernel), and a 1×1 kernel is used which convolves the input channels.

In a first variant, the convolutional blocks $20_i$ (with i=1, 2, 3) have the following structure:

first convolutional layer $21_i$: 1×1×ch/2;
second convolutional layer $22_i$: dw 1×3+1d mp;
third convolutional layer $23_i$: dw 3×1; and
fourth convolutional layer $24_i$: 2×1×ch+1d stride.

The first convolutional layer $21_i$ performs a pointwise convolution (which is not a depthwise, but a regular convolution) using a first kernel with a size of 1×1, i.e., the first kernel has a single row and a single column. The number of output channels of the first convolutional layer $21_i$ is ch/2.

The second convolutional layer $22_i$ performs a depthwise convolution ('dw') using a second kernel, wherein the second kernel has a size of 1×3, i.e., the second kernel has a single row and three columns. The depthwise convolution is followed by a max-pooling operation ('mp'). The pooling operation can be a one-dimensional pooling operation along a row. For example, if the pooling operator (or pooling kernel) has the size of 1×2 and is configured to output the maximum value, the pooling operator compares two input values that are arranged next to each other in a row and outputs the larger value.

The third convolutional layer $23_i$ performs a depthwise convolution ('dw') using a third kernel, wherein the third kernel has a size of 3×1, i.e., the third kernel has three rows and a single column.

The fourth convolutional layer $24_i$ performs a convolution (which is not a depthwise, but a regular convolution) using a fourth kernel with a size of 2×1, i.e., the fourth kernel has two rows and a single column. The number of output channels of the fourth convolutional layer $24_i$ is ch, which means that the number of output channels of the fourth convolutional layer $24_i$ is twice the number of the output channels of first convolutional layer $21_i$.

Further, the fourth convolutional layer $24_i$ applies the fourth kernel in strides to the pixels of the input of the fourth convolutional layer $24_i$, for example, in strides of two. The stride of the fourth kernel can be one-dimensional. The fourth kernel then convolves around the input by shifting a number of units along a column at a time, but not along a row.

In a second variant, the convolutional blocks $20_i$ (with i=1, 2, 3) have the following structure:
- first convolutional layer $21_i$: 1×1×ch/2;
- second convolutional layer $22_i$: dw 3×1+1d mp;
- third convolutional layer $23_i$: dw 1×3; and
- fourth convolutional layer $24_i$: 1×2×ch+1d stride.

The structure of the convolutional blocks $20_i$ in the second variant is similar to the structure of the convolutional blocks $20_i$ in the first variant. The difference is that the second convolutional layer $22_i$ of the second variant performs a depthwise convolution using a second kernel having a size of 3×1, i.e., the second kernel has three rows and a single column. Further, the pooling operation can be a one-dimensional pooling operation along a column. For example, if the pooling operator (or pooling kernel) has the size of 2×1 and is configured to output the maximum value, the pooling operator compares two input values that are arranged next to each other in a column and outputs the larger value.

Further, the third convolutional layer $23_i$ of the second variant performs a depthwise convolution using a third kernel, wherein the third kernel has a size of 1×3, i.e., the third kernel has a single row and three columns.

The fourth convolutional layer $24_i$ of the second variant performs a convolution using a fourth kernel with a size of 1×2, i.e., the fourth kernel has a single row and two columns.

Further, the fourth convolutional layer $24_i$ applies the fourth kernel in strides to the pixels of the input of the fourth convolutional layer $24_i$, for example, in strides of two. The stride of the fourth kernel can be one-dimensional. The fourth kernel then convolves around the input by shifting a number of units along a row at a time, but not along a column.

In a third variant, the convolutional blocks $20_i$ (with i=1, 2, 3) have the following structure:
- first convolutional layer $21_i$: 1×1×ch/2;
- second convolutional layer $22_i$: dw 3×1;
- third convolutional layer $23_i$: dw 1×3; and
- fourth convolutional layer $24_i$: 1×1×ch.

The structure of the convolutional blocks $20_i$ in the third variant is similar to the structure of the convolutional blocks $20_i$ in the first variant. The difference is that in the third variant no max-pooling is performed in the second convolutional layer $22_i$ and the fourth convolutional layer $24_i$ performs a pointwise convolution using a fourth kernel with a size of 1×1.

In addition, the fourth convolutional layer $24_i$ applies the fourth kernel in strides of one to the pixels of the input of the fourth convolutional layer $24_i$.

In the following, the idea behind the depthwise convolution is explained as can also be found at the following internet address: http://machinethink.net/blog/googles-mobile-net-architecture-on-iphone/.

Figure 2A:
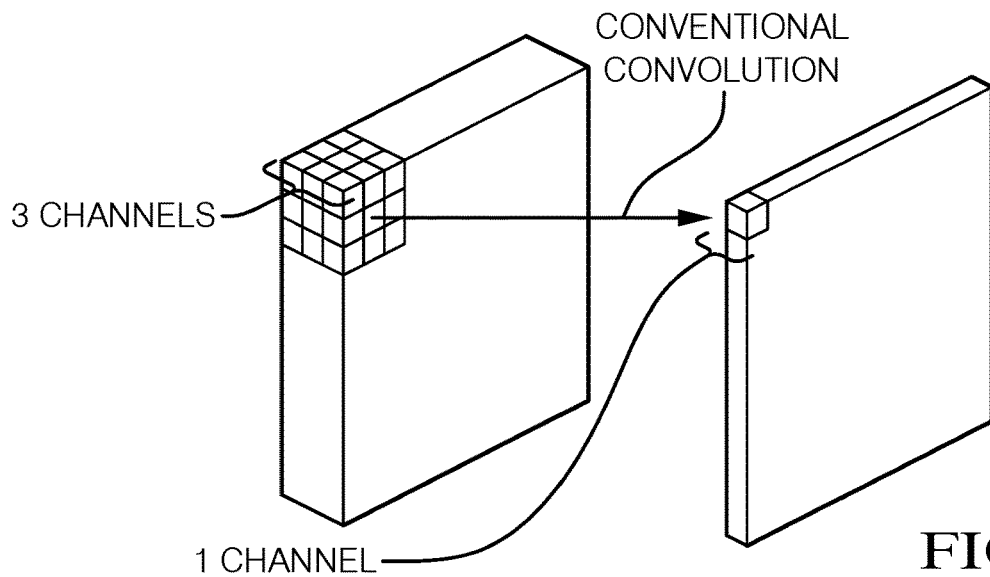
FIG. 2A shows a schematic representation of a conventional convolution.

A conventional (or regular) convolution layer applies a kernel to all of the channels of the input image. It slides this kernel across the image and at each step performs a weighted sum of the input pixels covered by the kernel across all input channels. The convolution operation thereby combines the values of all the input channels. If an image as shown in FIG. 2A has 3 input channels, then running a single convolution kernel across this image results in an output image with only 1 channel per pixel.

This means that for each input pixel, no matter how many channels it has, the convolution writes a new output pixel with only a single channel. In practice many convolution kernels run across the input image. Each kernel gets its own channel in the output.

Figure 2B:
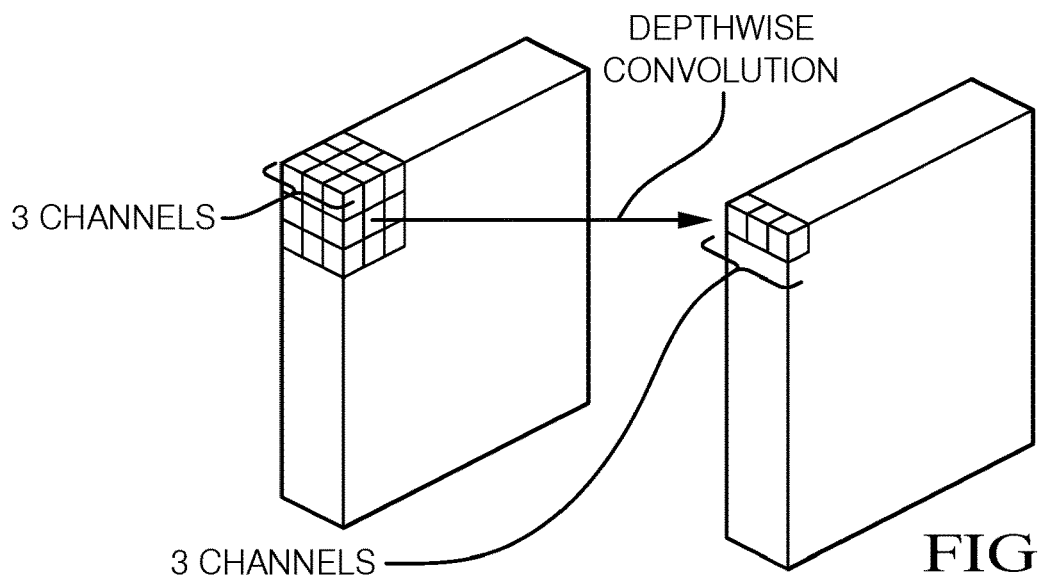
FIG. 2B shows a schematic representation of a depthwise convolution.

A depthwise convolution works as shown in FIG. 2B. Unlike a conventional convolution it does not combine the input channels but it performs a convolution on each input channel separately. For an image with 3 input channels, a depthwise convolution creates an output image that also has 3 channels. Each channel gets its own set of weights. The purpose of the depthwise convolution is to filter the input channels.

Figure 2C:
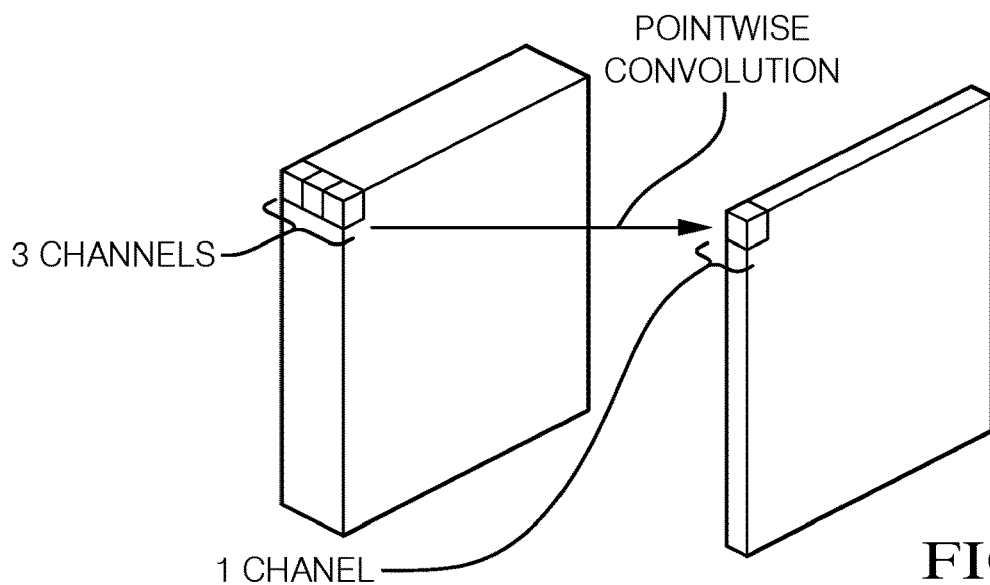
FIG. 2C shows a schematic representation of a pointwise convolution.

The depthwise convolution can be followed by a pointwise convolution as shown in FIG. 2C. The pointwise convolution is the same as a regular convolution but with a 1×1 kernel. The pointwise convolution adds up all the channels as a weighted sum. As with a regular convolution, many of these pointwise kernels are usually stacked together to create an output image with many channels. The purpose of the pointwise convolution is to combine the output channels of the depthwise convolution to create new features.

A depthwise convolution followed by a pointwise convolution is called a depthwise separable convolution. A conventional convolution does both filtering and combining in a single step, but with a depthwise separable convolution these two operations are done as separate steps.

Figure 3:
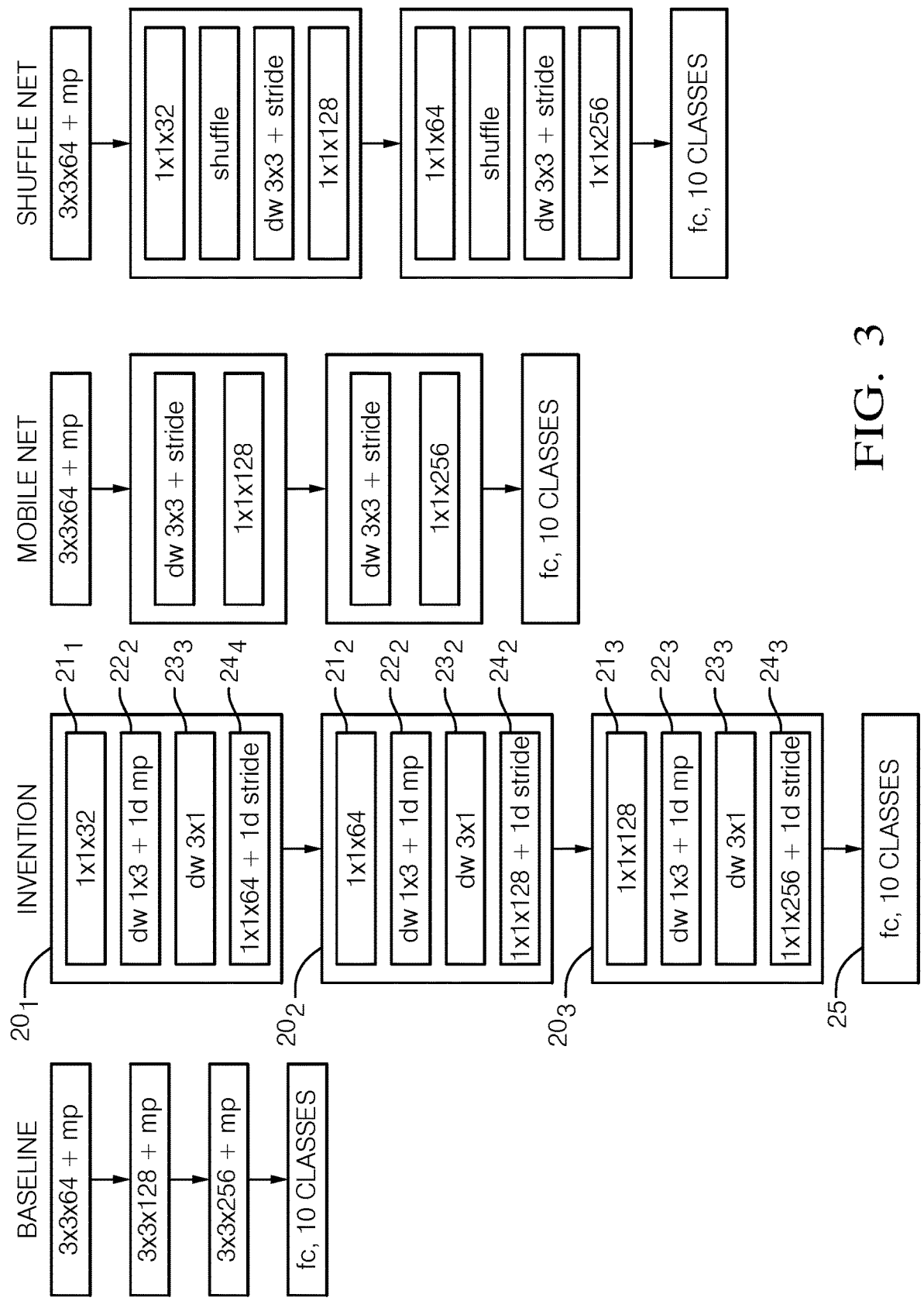
FIG. 3 shows a comparison of an exemplary embodiment of the invention with other network architectures.

FIG. 3 shows an exemplary embodiment of the first variant compared to three other network architectures. 'Baseline' is a conventional neural network, also called vanilla CNN. MobileNet is the model proposed by document D1. ShuffleNet is the model proposed by document D2. 'dw' and 'mp' stand for depthwise convolution and max-pooling, respectively. 'fc' layer means fully connected layer. 10 classes are used in all four network architectures shown in FIG. 3. The shapes in FIG. 3 and the following tables are given in the following format: rows of the kernel× columns of the kernel×output channels.

In the following the results of experiments are presented that were undertaken to evaluate the unified convolution block structure as proposed herein.

TABLE 1

| Layer | Shape out | Floats out |
| --- | --- | --- |
| 3 × 3 × 64 + mp | 16 × 16 × 64 | 16384 |
| 3 × 3 × 128 + mp | 8 × 8 × 128 | 8192 |
| 3 × 3 × 256 + mp | 4 × 4 × 256 | 4096 |
| 1 × 1 × 10 | 1 × 1 × 10 | 10 |

Table 1 shows the data compression in floating point numbers (short 'floats') throughout the baseline network without efficiency optimization. Convolutional neural networks are mostly well capable to handle a data compression of factor two.

TABLE 2

| Layer | Shape out | Floats out |
| --- | --- | --- |
| 3 × 3 × 64 + mp | 16 × 16 × 64 | 16384 |
| dw 3 × 3 × 64 + stride | 8 × 8 × 64 | 4096 |
| 1 × 1 × 128 | 8 × 8 × 128 | 8192 |
| dw 3 × 3 × 128 + stride | 4 × 4 × 128 | 2048 |
| 1 × 1 × 256 | 4 × 4 × 256 | 4096 |
| 1 × 1 × 10 | 1 × 1 × 10 | 10 |

Table 2 shows the data compression in floats throughout the MobileNet model as proposed by document D1. 'Stride' is an operation similar to max-pooling. The critical compression points are highlighted in bold. Layers from the same block have the same background color.

TABLE 3

| Layer | Shape out | Floats out |
| --- | --- | --- |
| 3 × 3 × 64 + mp | 16 × 16 × 64 | 16384 |
| gc4 1 × 1 × 32 + shuffle | 16 × 16 × 32 | 8192 |
| dw 3 × 3 × 32 + stride | 8 × 8 × 32 | 2048 |
| gc4 1 × 1 × 128 | 8 × 8 × 128 | 8192 |
| gc4 1 × 1 × 64 + shuffle | 8 × 8 × 64 | 4096 |
| dw 3 × 3 × 128 + stride | 4 × 4 × 64 | 1024 |
| gc4 1 × 1 × 256 | 4 × 4 × 256 | 4096 |
| 1 × 1 × 10 | 1 × 1 × 10 | 10 |

Table 3 shows the data compression in floats throughout the ShuffleNet model as proposed by document D2. 'shuffle' and 'gc4' are as explained in document D2. 'Stride' is an operation similar to max-pooling. The critical compression points are highlighted in bold. Layers from the same block have the same background color.

TABLE 4

| Layer | Shape out | Floats out |
| --- | --- | --- |
| 1 × 1 × 32 | 32 × 32 × 32 | 32768 |
| dw 1 × 3 × 32 + 1d mp | 32 × 16 × 32 | 16384 |
| dw 3 × 1 × 32 | 32 × 16 × 32 | 16384 |
| 2 × 1 × 64 + 1d stride | 16 × 16 × 64 | 16384 |
| 1 × 1 × 64 | 16 × 16 × 64 | 16384 |
| dw 1 × 3 × 64 + 1d mp | 16 × 8 × 64 | 8192 |
| dw 3 × 1 × 64 | 16 × 8 × 64 | 8192 |
| 2 × 1 × 128 + 1d stride | 8 × 8 × 128 | 8192 |
| 1 × 1 × 128 | 8 × 8 × 128 | 8192 |
| dw 1 × 3 × 128 + 1d mp | 8 × 4 × 128 | 4096 |
| dw 3 × 1 × 128 | 8 × 4 × 128 | 4096 |
| 2 × 1 × 256 + 1d stride | 4 × 4 × 256 | 4096 |
| 1 × 1 × 10 | 1 × 1 × 10 | 10 |

Table 4 shows the data compression in floats throughout an exemplary model of the invention. '1d mp' means one-dimensional max-pooling. The invention successfully eliminates all bottlenecks in the network while keeping the number multiplications to a minimum (see tables 5 and 6).

TABLE 5

| Model | Num. Multiplications | Ratio to Baseline | Accuracy (%) |
| --- | --- | --- | --- |
| Baseline | 39559168 | 1.00 | 79.50 |
| MobileNet | 4653056 | 0.12 | 77.70 |
| ShuffleNet | 2361344 | 0.06 | 75.60 |
| Invention | 5726208 | 0.14 | 81.20 |

Table 5 shows a model comparison on the Cifar10 data set, which is a fundamental data set in computer vision. In table 5 the number of multiplications and the accuracy of each of the models are compared. Notice how the model according to an exemplary embodiment of the invention is significantly more accurate then both MobileNet and ShuffleNet while only being slightly more expensive than MobileNet.

TABLE 6

| Model | Num. Multiplications | Ratio to Baseline | Accuracy (%) |
| --- | --- | --- | --- |
| Baseline | 1781760 | 1.00 | 91.08 |
| MobileNet | 532992 | 0.30 | 85.64 |
| ShuffleNet | 492288 | 0.28 | 82.73 |
| Invention | 390144 | 0.22 | 88.93 |

Table 6 shows a model comparison on the SVHN (street view house number) data set. Notice that when the model according to an exemplary embodiment of the invention is extremely small, this model is both significantly cheaper and more accurate then both MobileNet and ShuffleNet. Since the models are initialized with a random seed, all accuracies in tables 5 and 6 are the mean accuracy of multiple runs. This helps us even out cases of particularly good or particularly bad initialization.

While this invention has been described in terms of the preferred embodiments thereof, it is not intended to be so limited, but rather only to the extent set forth in the claims that follow.

We claim:

1. A device for image classification comprising a processor configured to:
   receive an image captured by a camera, the image comprising a plurality of pixels;
   execute a convolutional neural network configured to generate a plurality of probability values, each probability value being linked to a respective one of a plurality of predetermined classes and indicating the probability that the image or a pixel of the image is associated with the respective class, wherein the convolutional neural network comprises a plurality of convolutional blocks and each of the convolutional blocks comprises:
   a first convolutional layer configured to perform a pointwise convolution using a first kernel;
   a second convolutional layer configured to perform a depthwise convolution using a second kernel, wherein the second kernel has one of a single row and a single column;
   a third convolutional layer configured to perform a depthwise convolution using a third kernel, wherein the third kernel has a single column if the second kernel has a single row, and the third kernel has a single row if the second kernel has a single column; and
   a fourth convolutional layer configured to perform a convolution using a fourth kernel; and
   generate an output image based on the plurality of probability values in response to classifying the image based on the plurality of probability values.

2. The device as claimed in claim 1, wherein the number of columns of the second kernel is three and the number of rows of the third kernel is three if the second kernel has a single row, and wherein the number of rows of the second kernel is three and the number of columns of the third kernel is three if the second kernel has a single column.

3. The device as claimed in claim 1, wherein the second convolutional layer is configured to perform a pooling operation, in particular a one-dimensional pooling operation, after the depthwise convolution.

4. The device as claimed in claim 1, wherein the fourth convolutional layer is configured to apply the fourth kernel in strides to pixels of an input of the fourth convolutional layer.

5. The device as claimed in claim 1, wherein the number of output channels of the fourth convolutional layer is twice the number of the output channels of the first convolutional layer.

6. The device as claimed in claim 1,
   wherein the second kernel has a single row, the second convolutional layer is configured to perform a pooling operation after the depthwise convolution, and the fourth kernel has two rows and a single column, or wherein the second kernel has a single column, the second convolutional layer is configured to perform a pooling operation after the depthwise convolution, and the fourth kernel has a single row and two columns, or wherein the second convolutional layer is configured not to perform a pooling operation after the depthwise convolution and the convolution performed by the fourth convolutional layer is a pointwise convolution.

7. The device as claimed in claim 1, wherein at least one of: the first convolutional layer, the second convolutional layer, the third convolutional layer, and the fourth convolutional layer is configured to perform a rectification after the convolution.

8. The device as claimed in claim 1, wherein the second convolutional layer is configured to perform the depthwise convolution using at least two different second kernels, each of the at least two different second kernels having one of a single row and a single column, and wherein the third convolutional layer is configured to perform the depthwise convolution using at least two different third kernels, each of the at least two different third kernels having one of a single row and a single column.

9. The device as claimed in claim 1, wherein at least one of:

the number of output channels of the first convolutional layer is the number of input channels of the first convolutional layer multiplied with a factor; and at least one of the second convolutional layer and the third convolutional layer are configured to add a bias term after the depthwise convolution.

10. A system for image classification, the system comprising:

a camera configured to capture an image; and a device comprising a convolutional neural network configured to generate a plurality of probability values, each probability value being linked to a respective one of a plurality of predetermined classes and indicating the probability that the image or a pixel of the image is associated with the respective class, wherein the convolutional neural network comprises a plurality of convolutional blocks and each of the convolutional blocks comprises:

a first convolutional layer configured to perform a pointwise convolution using a first kernel;

a second convolutional layer configured to perform a depthwise convolution using a second kernel, wherein the second kernel has one of a single row and a single column;

a third convolutional layer configured to perform a depthwise convolution using a third kernel, wherein the third kernel has a single column if the second kernel has a single row, and the third kernel has a single row if the second kernel has a single column; and a fourth convolutional layer configured to perform a convolution using a fourth kernel; and wherein the device further comprises a processor configured to generate an output image based on the plurality of probability values in response to classifying the image based on the plurality of probability values.

11. A method for classifying images, the method comprising:

receiving an image captured by a camera, the image comprising a plurality of pixels;

using a convolutional neural network to generate a plurality of probability values, each probability value being linked to a respective one of a plurality of predetermined classes and indicating the probability that the image or a pixel of the image is associated with the respective class, wherein the convolutional neural network comprises a plurality of convolutional blocks and each of the convolutional blocks comprises:

a first convolutional layer performing a pointwise convolution using a first kernel, a second convolutional layer performing a depthwise convolution using a second kernel, wherein the second kernel has one of a single row and a single column, a third convolutional layer performing a depthwise convolution using a third kernel, wherein the third kernel has a single column if the second kernel has a single row, and the third kernel has a single row if the second kernel has a single column, and a fourth convolutional layer performing a convolution using a fourth kernel;

generating an output image based on the plurality of probability values in response to classifying the image based on the plurality of probability values.

12. The method as claimed in claim 11, wherein the number of columns of the second kernel is 3 and the number of rows of the third kernel is 3 if the second kernel has a single row, and wherein the number of rows of the second kernel is 3 and the number of columns of the third kernel is 3 if the second kernel has a single column.

13. The method as claimed in claim 11, wherein the second convolutional layer performs a pooling operation.

14. The method as claimed in claim 13, wherein the pooling operation is a one-dimensional pooling operation, after the depthwise convolution.

15. The method as claimed in one of the claim 11, wherein the fourth convolutional layer applies the fourth kernel in strides to pixels of an input of the fourth convolutional layer, and wherein the number of output channels of the fourth convolutional layer is twice the number of the output channels of the first convolutional layer.

16. The method as claimed in one of the claim 11, wherein the second kernel has a single row, the second convolutional layer performs a pooling operation after the depthwise convolution, and the fourth kernel has two rows and a single column, or wherein the second kernel has a single column, the second convolutional layer performs a pooling operation after the depthwise convolution, and the fourth kernel has a single row and two columns, or wherein the second convolutional layer does not perform a pooling operation after the depthwise convolution and the convolution performed by the fourth convolutional layer is a pointwise convolution.

* * * * *